US012687953B2

(12) United States Patent

Zhao et al.

(10) Patent No.: US 12,687,953 B2

(45) Date of Patent: Jul. 21, 2026

(54) DYNAMIC UPDATING OF PROJECTED KEYBOARD MODELS TO INCREASE TYPING EFFICIENCY OF A USER

(71) Applicant: International Business Machines Corporation, Armonk, NY (US)

(72) Inventors: Rong Zhao, Beijing (CN); Zhe Yan, Beijing (CN); Li Bo Zhang, Beijing (CN); Hao Xiang Wu, Beijing (CN); Li Li Guan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/009,752

(22) Filed: Jan. 3, 2025

(65) Prior Publication Data

US 2026/0195013 A1    Jul. 9, 2026

(51) Int. Cl.
G06F 3/042 (2006.01)
(52) U.S. Cl.
CPC .................................. G06F 3/0426 (2013.01)
(58) Field of Classification Search
CPC .................................................... G06F 3/0426
See application file for complete search history.

(56) References Cited

U.S. PATENT DOCUMENTS

| | | | |
|---|---|---|---|
| 6,359,572 B1 | 3/2002 | Vale | |
| 9,454,238 B2 * | 9/2016 | Gu | ............................ G06F 3/02 |
| 2009/0017907 A1 * | 1/2009 | Shimizu | .............. A63F 13/5258 |
| | | | 463/31 |
| 2009/0146957 A1 * | 6/2009 | Lee | ........................ G06F 3/0418 |
| | | | 345/173 |
| 2017/0329515 A1 | 11/2017 | Clement et al. | |
| 2018/0032245 A1 * | 2/2018 | Wu | ..................... G06F 3/04886 |
| 2020/0387214 A1 | 12/2020 | Ravasz et al. | |
| 2023/0154125 A1 * | 5/2023 | Beith | ...................... G06F 3/012 |
| | | | 345/633 |
| 2023/0229246 A1 | 7/2023 | Gerhard et al. | |

OTHER PUBLICATIONS

"Hologram keyboard", https://baijiahao.baidu.com/SID=1693257409265376588&wfr=spider&for=pc, Mar. 4, 2021, 2 pages.
Embedded Column. "Virtual keyboard based on laser projection technology(software)", retrieved from web https://zhuanlan.zhihu.com/p/44011475, Sep. 7, 2018, 14 pages.
Embedded Column, "Virtual keyboard based on laser projection technology (hardware)", https://zhuanlan.zhihu.com/p/42963682, dated Aug. 25, 2018, 14 pages.

* cited by examiner

*Primary Examiner* — Towfiq Elahi
(74) *Attorney, Agent, or Firm* — Stephen R. Yoder

(57) ABSTRACT

A method, according to one embodiment, includes causing a first keyboard model to be projected on a surface, causing cameras to monitor a first user with respect to at least three coordinate planes, collecting first information based on multiple positions of the first user's palm(s) with respect to multiple of the coordinate planes, and collecting second information based on vertical palm movement and/or horizontal finger shifts of the first user with respect to a first of the coordinate planes. The method further includes determining, based on the first information and the second information, updates for increasing a typing efficiency of the first user, generating a second keyboard model, wherein the second keyboard model is a version of the first keyboard model modified to include the determined updates, and causing the second keyboard model to be projected.

18 Claims, 11 Drawing Sheets

100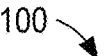

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

KEYBOARD UPDATING DETERMINATION CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

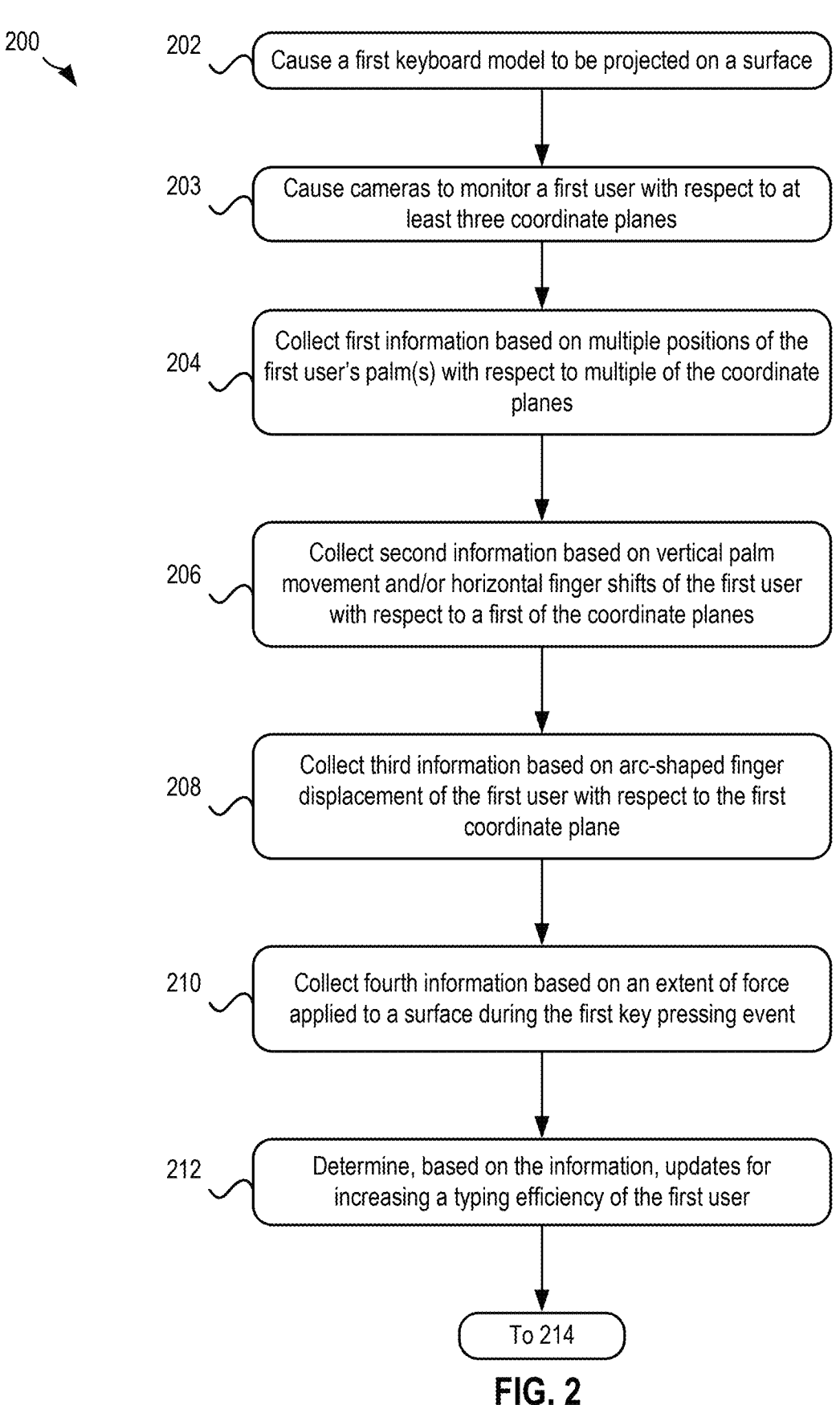

200

202  Cause a first keyboard model to be projected on a surface

203  Cause cameras to monitor a first user with respect to at least three coordinate planes 204  Collect first information based on multiple positions of the first user's palm(s) with respect to multiple of the coordinate planes 206  Collect second information based on vertical palm movement and/or horizontal finger shifts of the first user with respect to a first of the coordinate planes 208  Collect third information based on arc-shaped finger displacement of the first user with respect to the first coordinate plane 210  Collect fourth information based on an extent of force applied to a surface during the first key pressing event 212  Determine, based on the information, updates for increasing a typing efficiency of the first user To 214

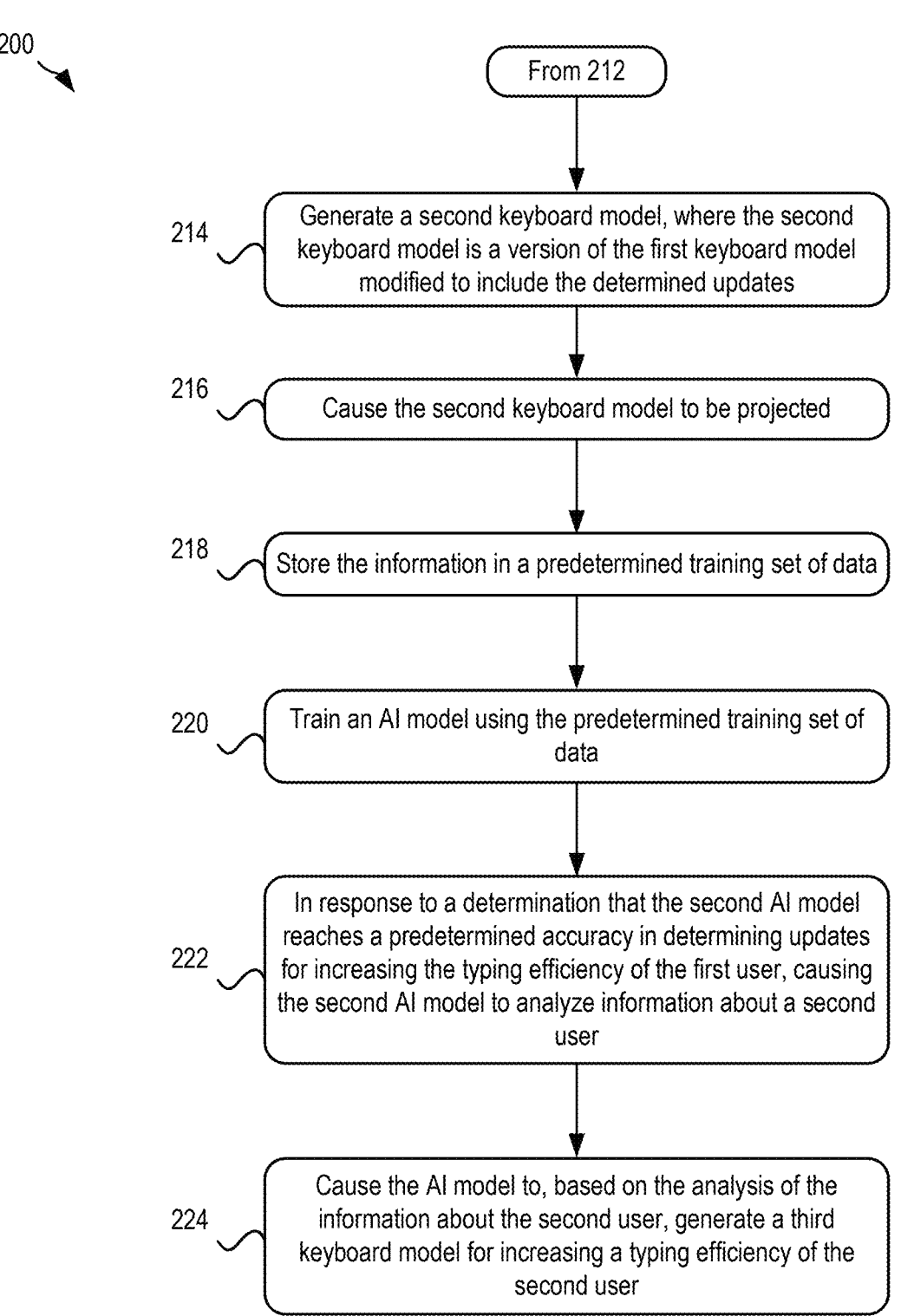

From 212

214 — Generate a second keyboard model, where the second keyboard model is a version of the first keyboard model modified to include the determined updates 216 — Cause the second keyboard model to be projected 218 — Store the information in a predetermined training set of data 220 — Train an AI model using the predetermined training set of data 222 — In response to a determination that the second AI model reaches a predetermined accuracy in determining updates for increasing the typing efficiency of the first user, causing the second AI model to analyze information about a second user 224 — Cause the AI model to, based on the analysis of the information about the second user, generate a third keyboard model for increasing a typing efficiency of the second user

Camera Views & Palms Positions          402

Hands Position 0

Palms Movement in 3D Space          404

Hands Position 1

406

Compare Hands Position

Keyboard Sphere Movements based on
Camera Imaging in 3D Space $\alpha = arccos(H_1/H_0)$ $S_p = S_0 * cos\alpha = S_0 * cos(arccos(H_1/H_0)) = S_0 * H_1/H_0$ $p = \{xy, yz, zx\}$

500

502

504

Keyboard Sphere 1

Keyboard Sphere 2

Keyboard Sphere 3

1234

$L_1$

QWER $L_0$

ASDF

550
502
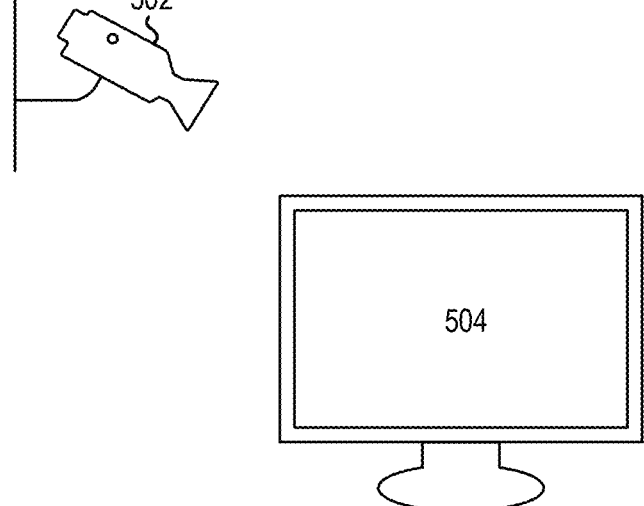
504
552
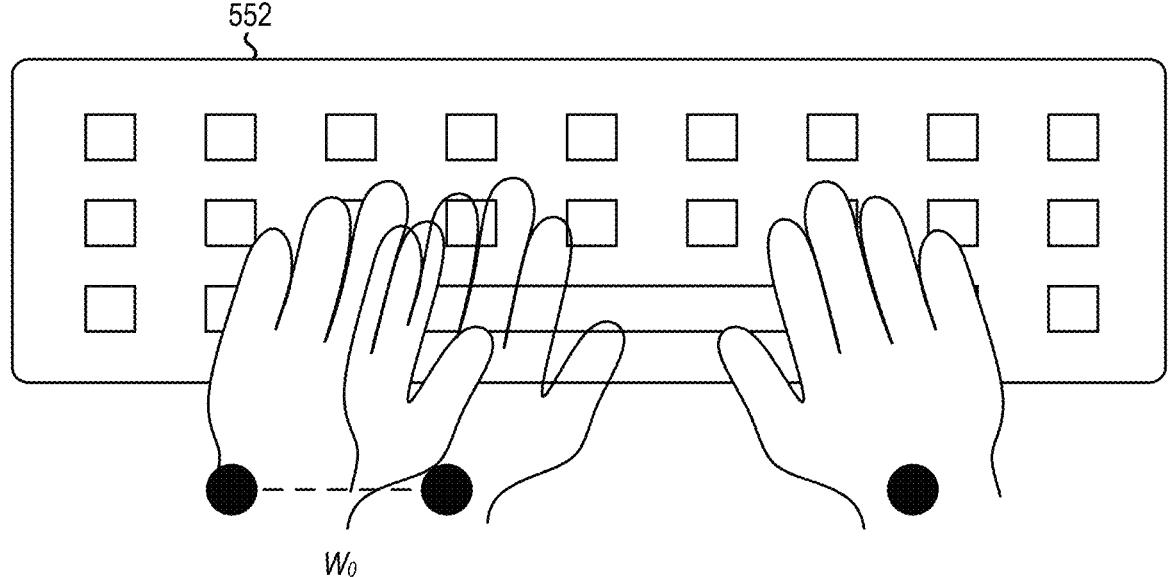
$W_0$
FIG. 5B

DYNAMIC UPDATING OF PROJECTED KEYBOARD MODELS TO INCREASE TYPING EFFICIENCY OF A USER

BACKGROUND

The present invention relates to keyboards, and more specifically, this invention relates to keyboard models.

Keyboards have been widely adopted as a hand-input device. Keyboards typically include, but are not limited to, traditional physical keyboards, laptop keyboards, virtual soft keyboards for input on mobile phones, tablets, and various touch screens, among other types of keyboards. Laser projection keyboards also exist on the market.

SUMMARY

A method, according to one embodiment, includes causing a first keyboard model to be projected on a surface, causing cameras to monitor a first user with respect to at least three coordinate planes, collecting first information based on multiple positions of the first user's palm(s) with respect to multiple of the coordinate planes, and collecting second information based on vertical palm movement and/or horizontal finger shifts of the first user with respect to a first of the coordinate planes. The method further includes determining, based on the first information and the second information, updates for increasing a typing efficiency of the first user, generating a second keyboard model, wherein the second keyboard model is a version of the first keyboard model modified to include the determined updates, and causing the second keyboard model to be projected.

A computer program product, according to another embodiment, includes one or more computer-readable storage media, and program instructions stored on the one or more storage media to perform the foregoing method.

A computer system, according to another embodiment, includes a processor set, one or more computer-readable storage media, and program instructions stored on the one or more storage media to cause the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

FIGS. 5A-5B depict keyboard model projections, in accordance with several embodiments of the present invention.

DETAILED DESCRIPTION

Figure 3:
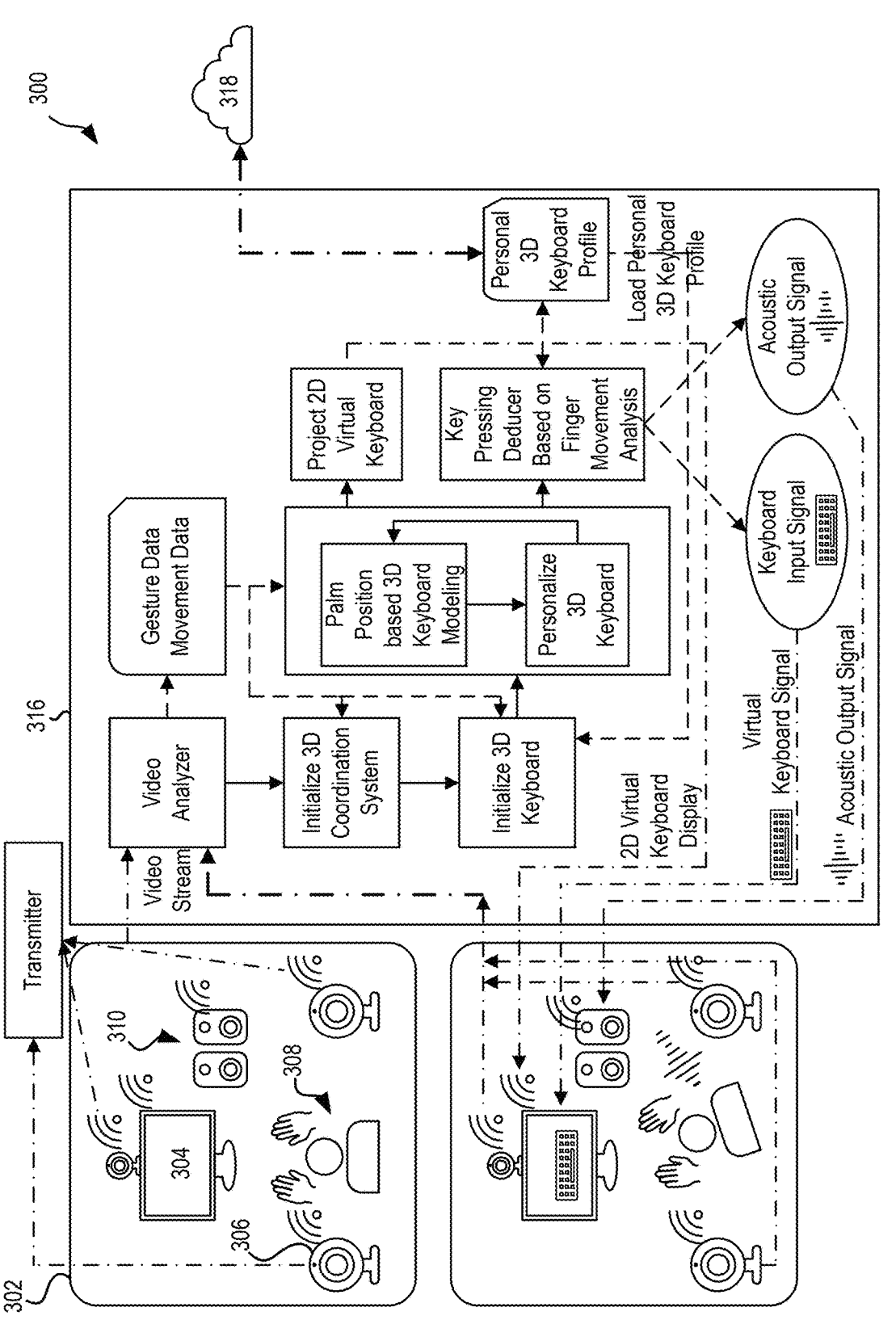
FIG. 3 depicts a system infrastructure, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic updating of projected keyboard models to increase typing efficiency of a user.

In one general embodiment, a method includes causing a first keyboard model to be projected on a surface, causing cameras to monitor a first user with respect to at least three coordinate planes, collecting first information based on multiple positions of the first user's palm(s) with respect to multiple of the coordinate planes, and collecting second information based on vertical palm movement and/or horizontal finger shifts of the first user with respect to a first of the coordinate planes. The method further includes determining, based on the first information and the second information, updates for increasing a typing efficiency of the first user, generating a second keyboard model, wherein the second keyboard model is a version of the first keyboard model modified to include the determined updates, and causing the second keyboard model to be projected.

In another general embodiment, a computer program product includes one or more computer-readable storage media, and program instructions stored on the one or more storage media to perform the foregoing method.

In another general embodiment, a computer system includes a processor set, one or more computer-readable storage media, and program instructions stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as keyboard updating determination code of block 150 for dynamic updating of projected keyboard models to increase typing efficiency of a user. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, keyboards have been widely adopted as a hand-input device. Keyboards typically include, but are not limited to, traditional physical keyboards, laptop keyboards, virtual soft keyboards for input on mobile phones, tablets, and various touch screens, among other types of keyboards. Laser projection keyboards also exist on the market.

Conventional keyboard-based input has a limited range of motion and relies on physical devices and/or input on a two dimensional plane. These conventional keyboards are limited and constrain data input because the layouts of these keyboards are fixed, e.g., not dynamically adaptable to different users. This creates input inefficiencies and introduces errors into the text that is processed by computer devices paired to the keyboards. More specifically, the fixed nature of these keyboards prevents the uniqueness of a user from being considered in the design of the keyboards. This uniqueness is, in some approaches, based on different users having unique palm and finger sizes. At the same time, each user's finger movement range, typing amplitude input habits and strength are also different, which often leads to cases of low accuracy of key input (which increases an overall workload of a computer device that attempts to identify and/or correct these inaccuracies). Despite the uniqueness of a given user, the fixed keyboard are designed with the expectation that the keyboards can be designed for, and used efficiently by, each individual user.

In sharp contrast to the deficiencies described above, the techniques of embodiments and approaches described herein enable personalized keyboard training tutorials and adjustments of keyboard layouts to improve the accuracy of keyboard input by identifying and mitigating areas of a keyboard layout that pose as obstacles to users. Accordingly, the techniques described herein mitigate errors within the technical field of data entry/processing, as well as decrease an overall workload of a computer device that is configured to identify and/or correct inaccuracies.

These techniques, in some preferred approaches, include establishing a three-dimensional coordinate system, in which cameras are installed in different dimensions to capture hand motion path and amplitudes of movements that a user makes. Based on information that indicates these captures, a three dimensional keyboard modeling is displayed and ongoingly updated (based on palms, fingers position, movement in three dimensional space, etc.). For example, finger tapping action(s) may be observed and judged, and the sound of these action(s) may be used as the feedback to indicate a tapping amplitude and strength to the user. In some approaches, techniques described herein include monitoring hand operations through a three dimensional keyboard sphere that is projected to the virtual keyboard on a two dimensional plane of a display terminal for mapping, so as to achieve the purpose of feedback to the user. Meanwhile, in the process of hand tapping, infrastructure of a system in which these techniques are performed continuously learns and stores feedback for a user's operation, and establishes a three dimensional keyboard model that is based on three dimensional space that conforms to the characteristics and habits of the personal hand(s) of the user. This keyboard modeling is then displayed and updated over time.

These techniques furthermore identify difficult and error-prone parts of a keyboard model when users use a free-hand keyboard, and intelligently generate a practice series to further assist users by correcting them. For example, a layout of the keyboard model may be trained and fine-tuned to adapt to the actual use habits of users in order to establish a personalized and customized keyboard model. Within these key models, different spatial areas are defined in the three dimensional space for multi-content input and intelligent auxiliary keyboard input.

Now referring to FIG. 2, a flowchart of a method 200 is shown according to one embodiment. The method 200 may be performed in accordance with aspects of the present invention in any of the environments depicted in FIGS. 1-8, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

In some approaches, method 200 includes causing a first keyboard model to be projected on a surface, e.g., see operation 202. For context, the first keyboard model may be a two dimensional keyboard model or a three dimensional keyboard model that is used as an initial keyboard model to determine a relative uniqueness of a first user as the first user performs gestures with respect to the first keyboard model, e.g., hand gestures that act as typing input for a computer device.

In some preferred approaches, the causing the first keyboard model to be projected on the surface includes a visual depiction of the first keyboard model to be displayed on a display device that the user has access to. This way, in some approaches, keystrokes and/or gestures performed by the user may be visually depicted to the user. More specifically, in some approaches, a representation of the keyboard may not be displayed on a typing surface of the user, so as to not alter natural typing behavior of the user to conform to the first keyboard model. Instead, as will be described in greater detail below, the user's natural behavior and typing habits are monitored in order to determine how to modify, e.g., update a current version of, the first keyboard model to ongoingly improve text input recognition for the user. In other words, the keyboard model may, in some approaches, be visible to the user (displayed keyboard on a display device), while in some other approaches, at least temporarily remains not shown to the user (used by a processor to determine text entry based on the user's hand gestures and movements).

The first keyboard model may include a number of key representations (e.g., outlines of areas on the surface that may be touched to cause an associated character and/or number to be entered into a paired computer device) in a configuration that would become apparent to one or ordinary skill in the art after reading the descriptions herein, e.g., "QWERTY" configuration, etc.

Operation 203 includes causing cameras to monitor a first user with respect to at least three coordinate planes. The cameras may, in some approaches, be mounted at a predetermined given angle in order to respectively calculate three projected areas of the user's palm(s) in a two dimensional coordinate system. For context, a coordinate plane may be defined as a plane of observation within which at least one hand of a user is observed to make movements in with respect to at least a portion of a keyboard model. For example, in FIG. 4A, a top down coordinate plane is illustrated in several depictions, while in FIG. 4B, a side coordinate plane (that is perpendicular to the top down coordinate plane) is illustrated with angular notations.

In some approaches, one or more of the at least three coordinate planes may not be visible to the first user. For example, the first keyboard model may, in some of such approaches, appear as a two dimensional keyboard that is displayed on a predetermined surface, e.g., a computer display. However, a series of cameras may be positioned to view different coordinate planes of the first keyboard plane, e.g., see different cameras that have different coordinate plane perspectives in FIG. 4A (top down coordinate plane) versus FIG. 4B (side coordinate plane). These cameras may be of a type that would become apparent to one of ordinary skill in the art after reading the descriptions herein.

As mentioned above, in preferred approaches, three cameras are mounted at a predetermined given angles in order to respectively calculate three projected areas of the user's palm(s) in a two dimensional coordinate system the cameras are mounted in. More specifically, in some of such approaches, these angles are respectively perpendicular to coordinate planes. For example, the first camera may be mounted perpendicular to the first coordinate plane which is an XY plane, a second of the coordinate planes may be a YZ plane, and a third of the coordinate planes may be a ZX plane. It may be prefaced that information may be collected based on these camera positions (see operation 204 elsewhere below), to respectively calculate the three projected areas of the palm in the three two-dimensional coordinate systems, XY, YZ, ZX. This way the two-dimensional coordinate system with the relatively biggest project area may be identified as the final projected plane for the keyboard model.

Information is collected based on interactions of the first user with the first keyboard model. However, this information is preferably only collected subsequent to receiving permission from the first user, e.g., an opt-in. In some approaches, this information is collected by causing, e.g., instructing, cameras to record and/or identify types of movement within interactions of the first user with the first keyboard model. The information may, in some approaches, be collected and be based on all observations made within one or more of the coordinate planes. In contrast, in some other approaches, the information may be collected and be based on all observations made with respect to a predetermined portion of the first user's body, e.g., a predetermined portion of a predetermined finger (as will be described in greater detail elsewhere below).

Operation 204 includes collecting first information based on multiple positions of a first user's palm(s) with respect to multiple of the coordinate planes (also referred to herein as "keyboard spheres"). More specifically, as mentioned elsewhere above, the information is preferably collected by the cameras mounted respectively perpendicular to planes XY, YZ, and ZX. Within this collection, in some approaches, a first camera is positioned to view a top down perspective of a back of the user's palm(s) positioned over a typing area that is correlated with projected first keyboard model. The first camera may then monitor, document and/or compare different hand positions (based on palm movement in three dimensional space) over an associated portion of projected first keyboard model. In some approaches, a second camera may additionally be used to collect the first information. For example, a second camera may view a side perspective (a different coordinate plane) of the user's hand positions, to further define the first user's palm positions with respect to multiple of the coordinate planes.

Figure 4A:
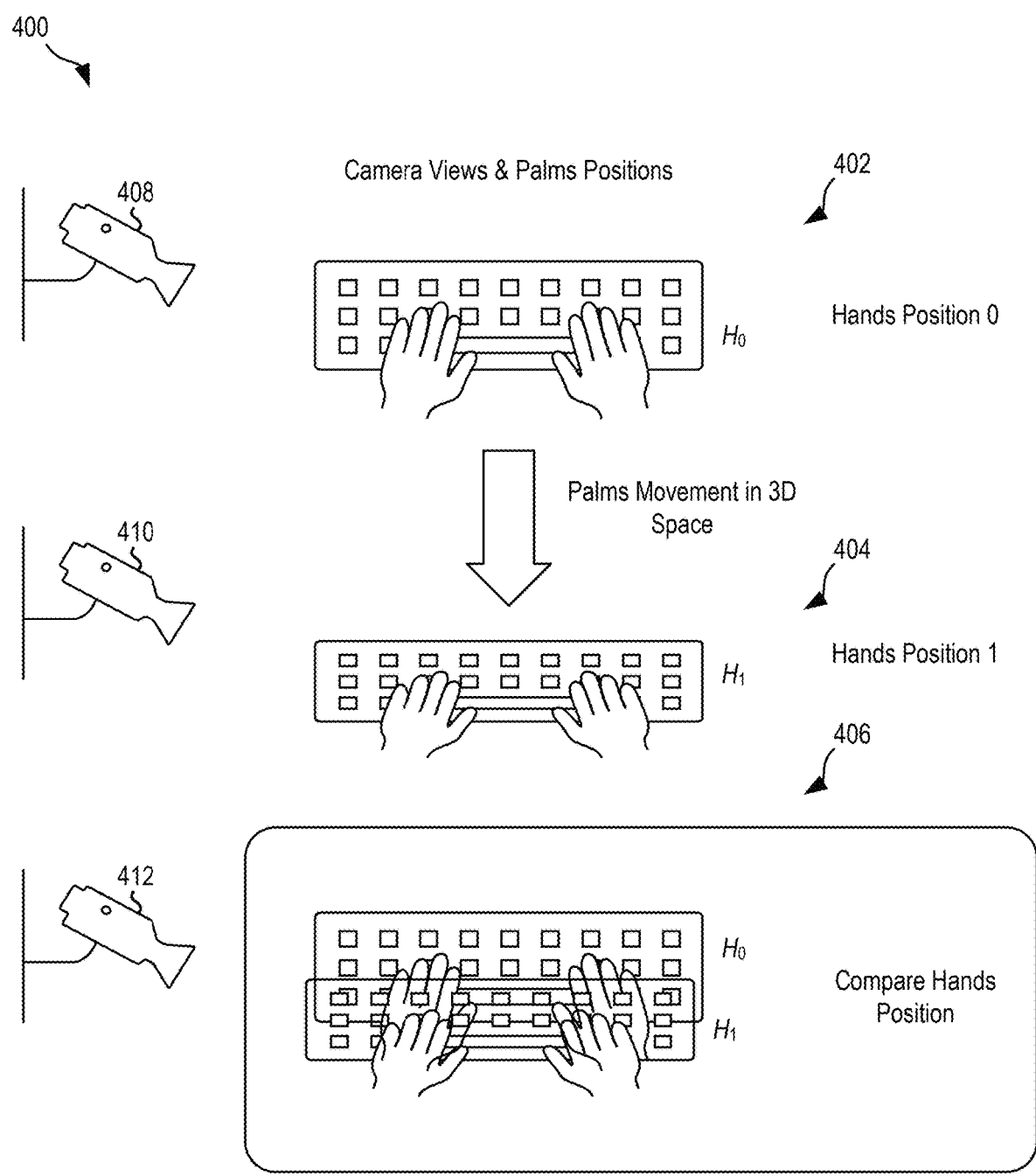
FIGS. 4A-4B depict keyboard model projections, in accordance with several embodiments of the present invention.
Figure 4B:
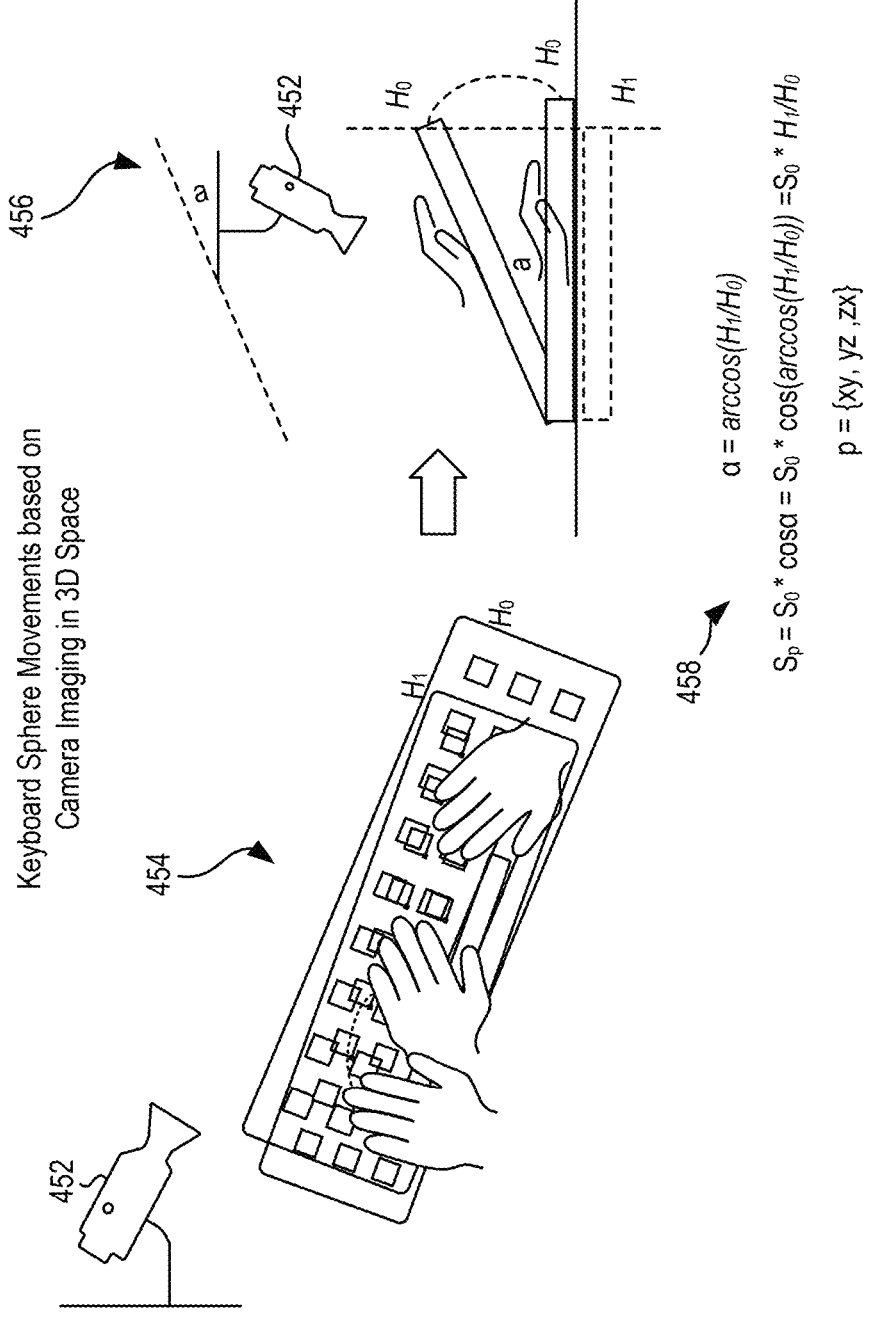

In some approaches, these different planes may be based on different rotational positions of the first user's wrist(s), e.g., see FIG. 4B. For example, a first coordinate plane may exist below the first user's hand(s) while the first user's hand(s) rest about parallel with the surface that the first keyboard model is projected on. In contrast, a second coordinate plane may exist below the first user's hand(s) while the first user's hand(s) rest angularly displaced from the surface that the first user is performing gestures with respect to, e.g., free floating in the air, tapping on a desk, etc. Trigonometric functions of a type that would become apparent to one of ordinary skill in the art after reading the descriptions herein may be used to collect and/or compare the different first information. In some approaches, the plane (of the planes XY, YZ, and ZX) with the relatively largest projected area in three dimensional space may be identified as the final projected plane for the keyboard model, and may thereby be selected as the projection analysis plane for a subsequent analysis of palm and finger movement of the first user to establish updates to the first keyboard model (where the updates may include projecting a curve bare-handed three dimensional keyboard).

Operation 206 includes collecting second information based on vertical palm movement and/or horizontal finger shifts of the first user with respect to a first of the coordinate planes. Vertical palm movement and/or horizontal finger shifts of the first user are, in some approaches, based on the same selected projected plane (mentioned elsewhere above) which is with the relatively largest projected area in the three two dimensional planes based on the mounted three camera configuration. In some approaches, this plane is viewed by the first camera that is positioned to view the top down perspective of the user's hands positioned over a rested typing position. In some approaches, collecting the second information based on vertical palm movement includes monitoring and documenting vertical palm displacement between keyboard spheres to identify linefeeds. For example, a first keyboard sphere may be defined as an area of the first keyboard model that the first user's hands are located over while detected to make gestures that correspond to typing on a first row of characters of the first keyboard model. For example, considering the standard traditional "ASDF" keyboard, detected original positions of the fingers of the left hand of the user may be a "ASDFG" position of a first keyboard sphere, with the original finger positions of the right hand may be in a "HJKL" position. In response to determining that the user fingers move upwards with more than a predetermined amount of shift are considered as "QWERT" and "YUIOP" positions of another keyboard sphere, while relatively opposite movements of the fingers are preferably considered as "ZXCVB" and "NM< >?" positions in another keyboard sphere.

Horizontal finger displacement, in some approaches, is based on the same keyboard spheres mentioned above. Information about horizontal finger displacement includes information that defines identified finger shifts within the same keyboard line of the first keyboard model.

Operation 208 includes collecting third information based on arc-shaped finger displacement of the first user with respect to the first coordinate plane. In some approaches, the collecting third information based on arc-shaped finger displacement of the first user with respect to the first coordinate plane comprises causing at least a first camera to track a middle finger of the first user's hand during a first instance of the arc-shaped finger displacement of the first user with respect to the first coordinate plane. For context, the middle finger of the user is tracked through these arc-shaped finger displacements of the first user in order to determine an extent of displacement that the first user performs during typing. More specifically, these displacements may be evaluated to determine whether they amount to an inefficiency. For example, such an inefficiency may be based on the user having to displace to such an extent that an update could decrease the extent that is required for the user's finger to achieve the same text entry. The collecting third information based on arc-shaped finger displacement of the first user with respect to the first coordinate plane may, in some approaches, additionally and/or alternatively comprise determining whether the arc-shaped finger displacement exceeds a predetermined threshold arc distance. The predetermined threshold arc distance may be set and dynamically adjusted based using techniques that would become apparent to one of ordinary skill in the art after reading the descriptions herein. In response to a determination that the arc-shaped finger displacement exceeds the predetermined threshold arc distance, a determination may be made that a first key pressing event has occurred and information about the first key pressing event (and/or any other determined key pressing events) may be stored to a predetermined file. For context, this information may be stored to the predetermined file to thereafter be accessed to determine updates and/or train an artificial intelligence (AI) model (e.g., to generate a trained artificial intelligence model), as will be described in greater detail elsewhere below.

It should be noted that although the first finger of the first user's hand is used in the example above, one or more other fingers and/or identifiable portions of the user's hand(s) may additionally and/or alternatively be used in other approaches.

In some approaches, method 200 may additionally and/or alternatively comprise collecting fourth information based on an extent of force applied (e.g., tapping amplitude and/or strength) to the surface during the first key pressing event, e.g., see operation 210. In one or more of such approaches, the extent of force may be captured and/or determined using techniques that would become apparent to one or ordinary skill in the art after reading the descriptions herein, e.g., touch sensitive elements on the surface, a speed measurement component of the camera, etc.

Operation 212 includes determining, based on the information (the first information, the second information, the third information, and/or the fourth information), updates for increasing a typing efficiency of the first user. More specifically, in some preferred approaches, these updates include updates that may be made to the first keyboard model to increase a typing speed of the first user and reduce a number of typing errors that are processed by a computer device performing method 200. Various updates are described in approaches below.

In some approaches, the determined updates include rearranging a placement of one or more keys of the first keyboard model. For example, a placement of a first key of the first keyboard model may be rearranged in a second keyboard model (where the rearrangement of at least the first key establishes the second keyboard model). In some approaches, the rearranging the placement of the first key of the first keyboard model in the second keyboard model comprises centering the first key at a forecasted location of a key pressing event on the second keyboard model. In one or more of such approaches, the forecast may be made by an analysis that is caused to be performed by a trained AI model described herein. Furthermore, in some approaches, the forecasted location of the key pressing event on the second keyboard model may be a forecasted average tap location of the first key on the second keyboard model.

In another approach, the determined updates may additionally and/or alternatively include decreasing a size of the first key (and/or any other key of the first keyboard model). In contrast, in another approach, the determined updates may additionally and/or alternatively include increasing a size of the first key (and/or any other key of the first keyboard model). The determined updates may additionally and/or alternatively include changing a placement and/or an angular positioning of a device used to collect the first information and/or the second information, e.g., one or more of the plurality of cameras may be instructed to change position and/or placement.

In some approaches, at least some of the updates for increasing the typing efficiency of the first user are based on the fourth information. In one or more of such approaches, the determined updates may include visual feedback and/or audio feedback played by a device paired with a device that projects the second keyboard model. In some approaches, a virtual two dimensional soft keyboard may be displayed in the display device (monitor) to provide the end user with this feedback. For example, in some approaches, any key that is determined to be considered pressed (based on detected user gestures and/or movement) may be visually depicted as being pressed down and/or changing to a different color. Acoustic effects that can be heard by the user is another example of feedback that may be played to provide feedback of detected key press events. This feedback may cause the first user to, over time, learn a minimal extent of movement, e.g., finger movement, hand movement, etc., that triggers recognition of a key pressing event. In some approaches, infrastructure associated with some approaches described herein do not use wearable devices that would otherwise provide haptic feedback. However, the monitor may, in some approaches, show the pressing of the specific key in response to a detection that key press behavior is detected from the user.

Operation 214 includes generating a second keyboard model, where the second keyboard model is a version of the first keyboard model modified to include the determined updates. In other words, although different "models" are described to be generated and projected, in some preferred approaches, for a given user, the keyboard model is a fluid model that is ongoingly updated over time based on the determinations made in method 200. The second keyboard model is caused to be projected, e.g., see operation 216.

In some approaches, a device performing method 200 may use a trained AI model to perform one or more of the operations described herein. For example, in some approaches, method 200 comprises causing a first trained AI model to analyze the predetermined file (that includes information about key pressing event(s)). This analysis may include the AI model being caused, e.g., instructed, to determine the updates for increasing the typing efficiency of the first user. Accordingly, in some approaches, the updates for increasing the typing efficiency of the first user are obtained as an output of the first trained AI model.

Operations of method 200, in some approaches, additionally and/or alternatively include training an AI model. For example, operation 218 includes storing, in a predetermined training set of data, the first information, the second information, the third information, and/or the fourth information. Operation 220 includes training a second AI model using the predetermined training set of data. This way, in some approaches, the operations of method 200 may be performed by an AI model that is trained using the predetermined training set of data. For example, in some approaches, various of the operations noted above may be deployed in a trained state of a trained AI model. Training of the AI model, in some approaches, may be performed by applying a predetermined training data set to learn how to identify portions of a currently projected keyboard model that can be updated to increase user typing speed and/or reduce an extent of error processing performed by a computer device that processes input received on the projected keyboard model. Initial training may include reward feedback that may, in some approaches, be implemented using a subject matter expert (SME). However, to prevent costs associated with relying on manual actions of a SME, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for performing techniques and/or operations of method 200 may be performed. In some further approaches, the AI model may be a neuromyotonic AI model that may improve performance of computer devices in an infrastructure associated with projecting and updating keyboard models, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received from users of the keyboard models. Such an AI model ensures that keyboard models are refined according to the uniqueness of users, where the scale of such analysis and determinations would not otherwise be feasible for a human to perform. This is because humans are not able to efficiently identify inefficiencies during rapid typing on a keyboard, and would otherwise incorporate processing delays and errors in text entry and analysis thereof in the process of attempting to do so. Accordingly, management of operations described herein is not able to be achieved by human manual actions.

As indicated above, in response to a determination that the second AI model reaches a predetermined accuracy in determining updates for increasing the typing efficiency of the first user, the second AI model may be caused, e.g., instructed, to analyze information about a second user, e.g., see operation 222. In other words, the trained second AI model may be deployed. For example, operation 224 includes causing the second AI model to, based on the analysis of the information about the second user, generate a third keyboard model for increasing a typing efficiency of the second user.'

FIG. 3 depicts a system infrastructure 300, in accordance with one embodiment. As an option, the present system infrastructure 300 may be implemented in conjunction with features from any other embodiment listed herein, such as those described with reference to the other FIGS. Of course, however, such system infrastructure 300 and others presented herein may be used in various applications and/or in permutations which may or may not be specifically described in the illustrative embodiments listed herein. Further, the system infrastructure 300 presented herein may be used in any desired environment.

The system infrastructure 300 includes a first snapshot 302 of a room in which a first user 308 is using a first keyboard model that is paired with a computer device 304. The room additionally includes a plurality of cameras 306 caused to monitor the first user with respect to at least three coordinate planes, and speakers 310. Information is collected from the devices, e.g., see "video stream" feeds of the cameras are received by a video analyzer of processing circuit 316 via a transmission device (transmitter such as a router or another device that would become apparent to one of ordinary skill in the art after reading the descriptions herein).

The processing circuit 316 of the system infrastructure 300 may be caused to analyze the information. For example, gesture data and movement data of the collected information may be used to determine an initial and/or an updated keyboard model, e.g., see initialize 3D keyboard and project 2D virtual keyboard, which may be based on an initialized 3D coordination system that the cameras monitor with respect to. This initialization may additionally and/or alternatively be determined based on an analysis of the information that details palm locational information, e.g., see Palm Position based 3D Keyboard Modeling.

It should be noted that, in some preferred approaches, the first keyboard model may be based on a personal profile of the first user, e.g., see Personal 3D Keyboard Profile, which may be stored on a cloud storage device 318. In some approaches, information from this profile is pulled from the cloud storage device 318 in order to generate an updated version (see "Personalize 3D keyboard") of the first keyboard model (which is a modified state of the first version of the keyboard model depicted in "Initialize 3D keyboard"). For example, in some approaches, the updated version of the first keyboard model is a second keyboard model that includes updates determined based on an analysis of the collected information, e.g., see Key Pressing Deducer Based on Finger Movement Analysis. In some approaches, this information may include personal information including palm, fingers, tapping habits, etc., or other information stored in the "Personal 3D Keyboard Profile". The second keyboard model is a version of the first keyboard model modified to include the determined updates. In other words, although different "models" are described to be generated and projected, in some preferred approaches, for a given user, the keyboard model is a fluid model that is ongoingly updated over time based on the determinations made in processing circuit 316.

In some approaches, the determined updates include haptic feedback and/or audio feedback played by a device paired with a device that projects the second keyboard model, e.g., see Virtual Keyboard Signal and Acoustic Output Signal.

FIGS. 4A-4B depict keyboard model projections 400 and 450, in accordance with several embodiments. As an option, the present keyboard model projections 400 and 450 may be implemented in conjunction with features from any other embodiment listed herein, such as those described with reference to the other FIGS. Of course, however, such keyboard model projections 400 and 450 and others presented herein may be used in various applications and/or in permutations which may or may not be specifically described in the illustrative embodiments listed herein. Further, the keyboard model projections 400 and 450 presented herein may be used in any desired environment.

Referring first to FIG. 4A, the keyboard model projection 400 includes several hand positions with respect to keyboard models. Three cameras 408, 410 and 412 are mounted at a predetermined given angles in order to respectively calculate three projected areas of the user's hand positions, e.g., palm(s), in a two dimensional coordinate system that the cameras are in. More specifically, in some of such approaches, these angles are respectively perpendicular to an XY first coordinate plane, a YZ second coordinate plane, and a ZX third coordinate plane.

For a first hand position detection for a first keyboard model 402, a first user's hands are positioned with respect to a first keyboard model 402, while the keyboard model 404 is the projected keyboard of the first (original) keyboard model 402 for camera 408. The different hand positions, e.g., see $H_0$ versus $H_1$ may be compared based on these camera positions, e.g., see comparison 406, to respectively calculate the three projected areas of the palm in the three two-dimensional coordinate systems, XY, YZ, ZX. In other words, the projection purpose is to find the relatively largest projected area to locate a keyboard baseline and confirm which camera of the three cameras may be considered a primary camera with respect to the palm position. Observations from this camera may then be used to determine how to update the keyboard model over time to increase a typing efficiency of the user.

Referring now to FIG. 4B, different hand positions are shown in the keyboard model projection 450 with respect to a different view of a primary camera 452 (mentioned determined in FIG. 4A). More specifically, keyboard sphere movements based on camera imaging in three dimensional space are illustrated in accordance with one embodiment.

In some approaches, the different hand positions of FIG. 4A may include different rotational positions of the first user's wrist(s), e.g., see representation of spheres 454 of FIG. 4B. Referring now to representation 456 of FIG. 4B, a first coordinate plane ($H_0$) is shown to exist below the first user's hand(s) while the first user's hand(s) rest about parallel with a surface. In contrast, a second coordinate plane ($H_1$) may exist below the first user's hand(s) while the first user's hand(s) rest angularly displaced from the surface. Trigonometric functions 458 may be used to compare the different planes and, in some approaches, the plane with the relatively largest projected area in three dimensional space is selected as the projection analysis plane (and a primary camera viewing this plane may then be used) for a subsequent analysis of palm and finger movement of the first user to establish updates to the first keyboard model (where the updates may include projecting a curve bare-handed three dimensional keyboard).

Figure 5A:
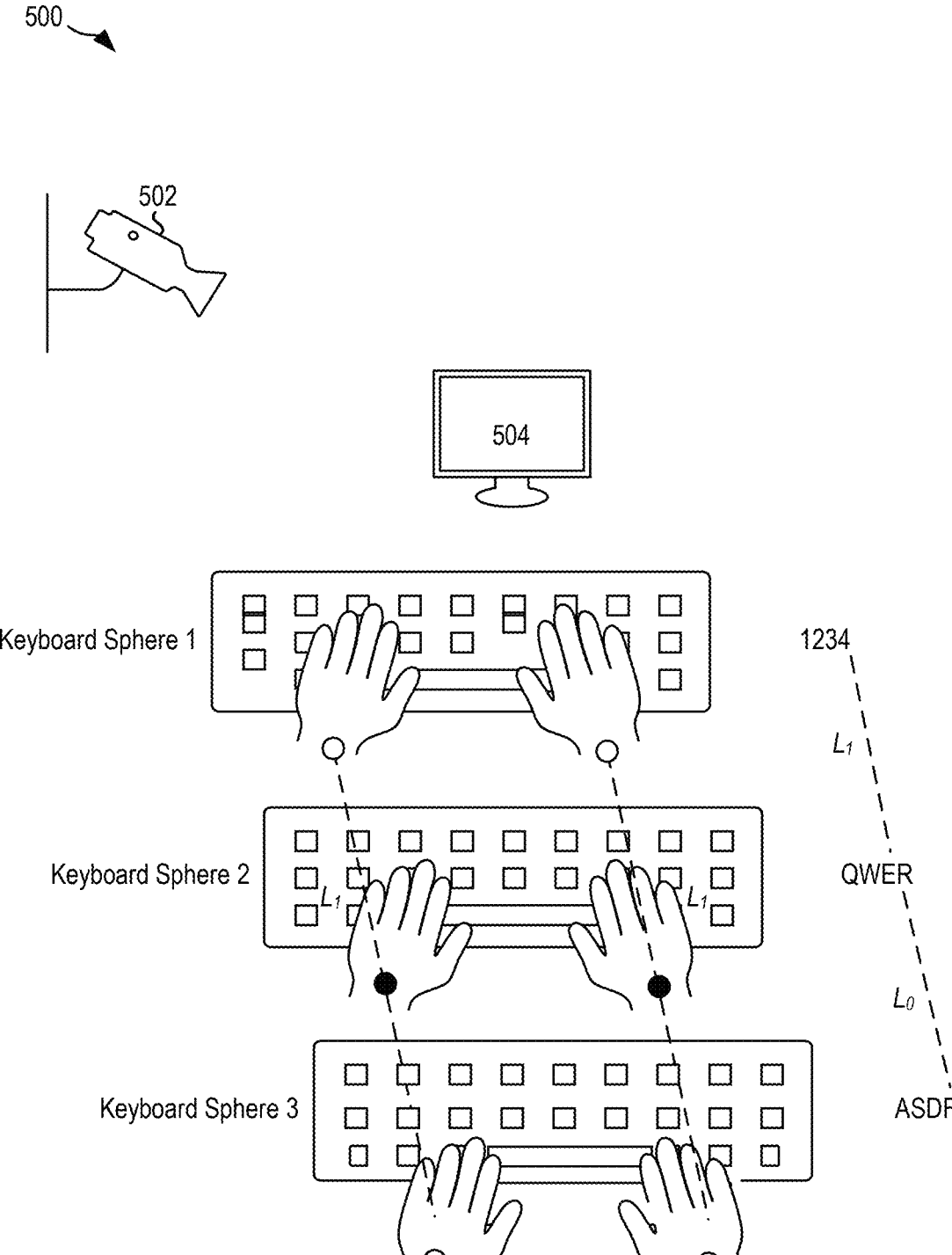

FIGS. 5A-5B depict keyboard model projections 500 and 550, in accordance with several embodiments. As an option, the present keyboard model projections 500 and 550 may be implemented in conjunction with features from any other embodiment listed herein, such as those described with reference to the other FIGS. Of course, however, such keyboard model projections 500 and 550 and others presented herein may be used in various applications and/or in permutations which may or may not be specifically described in the illustrative embodiments listed herein. Further, the keyboard model projections 500 and 550 presented herein may be used in any desired environment.

Referring first to FIG. 5A, it should be noted that palm positions in each compared keyboard is different in three spheres. These positions are monitored by at least a first camera 502, and a keyboard model for the user may be displayed, e.g., see display 504. Techniques described herein may be used to locate palm and finger in order to enable a judgement of the which row of the keyboard model is operated (e.g., user is operated on default row "ASDF" or upper row: "QWER" or lower row: "ZXCV").

In some approaches, the original finger position may be based on the QWER keyboard, which means that the baseline position of the user's index finger of the left hand is around key "F", and the baseline position of the user's index finger of the right hand is around key "J".

In some approaches, any vertical movement of palm/fingers may be detected and associated with an intention to switch to a different keyboard row (sphere).

Referring now to FIG. 5B, horizontal palm and/or finger displacement, in some approaches, is based on the same keyboard spheres mentioned above. Information about horizontal finger displacement includes information that defines identified finger shifts within the same keyboard line of the first keyboard model 552. For example, any horizontal movement of the user's palm and/or fingers may be identified and associated with an intention to press some key in the same row, while left limited movement of the user's index finger of the left palm and pressing may be detected and associated with the user's intention to press key "D" instead of the original key "F" within the keyboard model 552.

Figure 6:
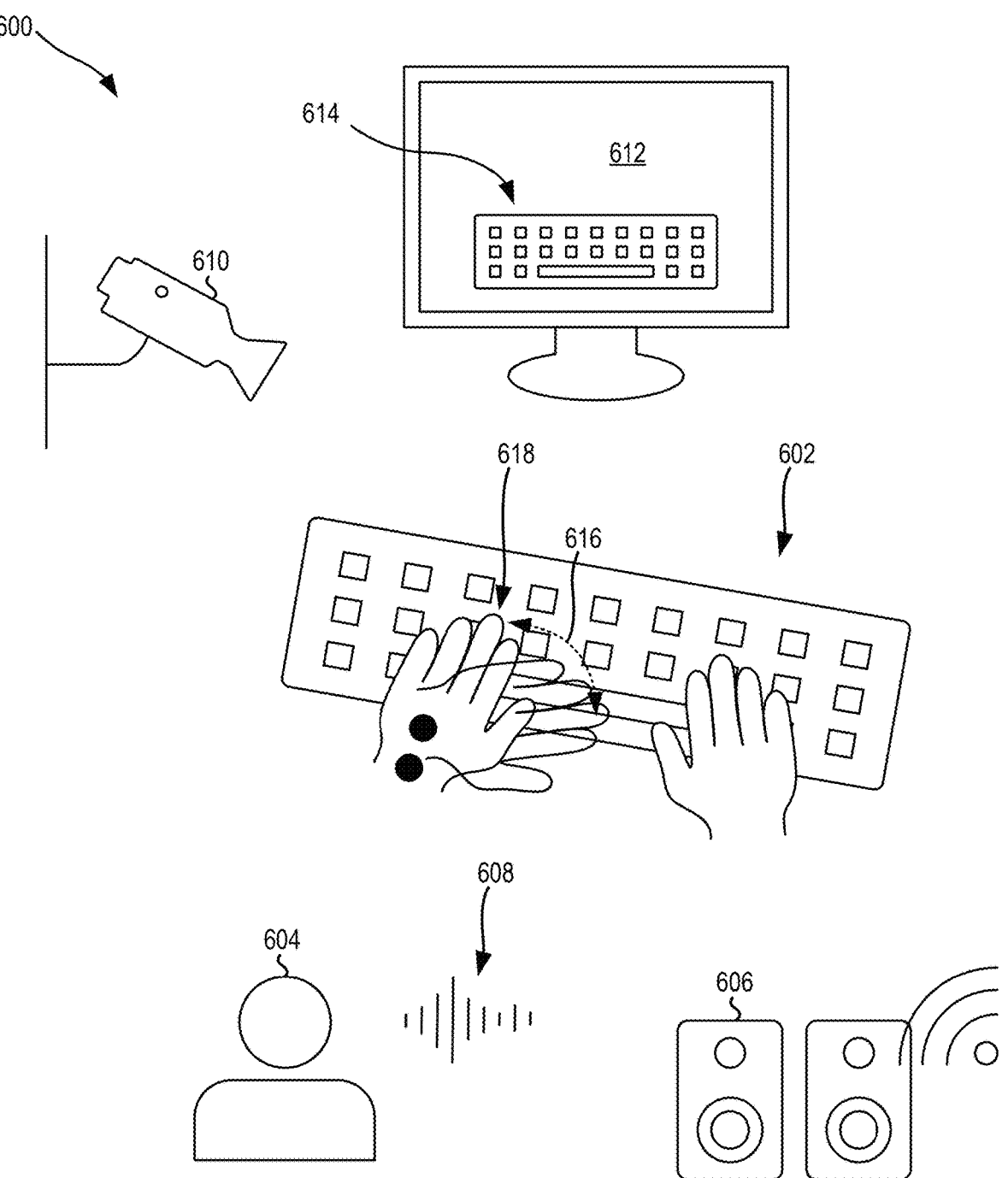
FIG. 6 depicts a keyboard model projection within an environment, in accordance with one embodiment of the present invention.

FIG. 6 depicts a keyboard model projection 600 within an environment, in accordance with one embodiment. As an option, the present keyboard model projection 600 may be implemented in conjunction with features from any other embodiment listed herein, such as those described with reference to the other FIGS. Of course, however, such keyboard model projection 600 and others presented herein may be used in various applications and/or in permutations which may or may not be specifically described in the illustrative embodiments listed herein. Further, the keyboard model projection 600 presented herein may be used in any desired environment.

The keyboard model projection 600 includes a first keyboard model 602 that is projected for a first user 604. The environment in which the keyboard model is projected includes speakers 606 for feedback 608, at least one camera 610, and a computer display 612. For example, in some approaches, an amplitude and acceleration of finger tapping are monitored and converted into tapping strength which may be fed back to the user through the audio via an acoustic system. The computer display 612 also displays a representation 614 of the keyboard model for the user to view.

Information may be collected based on arc-shaped finger displacement 616 of the first user with respect to a first coordinate plane. In some approaches, collecting the information based on arc-shaped finger displacement of the first user with respect to the first coordinate plane comprises causing at least the camera 610 to track a middle finger 618 of the first user's hand during at least a first instance of the arc-shaped finger displacement of the first user with respect to the first coordinate plane. A determination is made as to whether the arc-shaped finger displacement exceeds a predetermined threshold arc distance. In response to a determination that the arc-shaped finger displacement exceeds the predetermined threshold arc distance, a determination is made that a first key pressing event has occurred and information about the first key pressing event is stored to a predetermined file.

Figure 7:
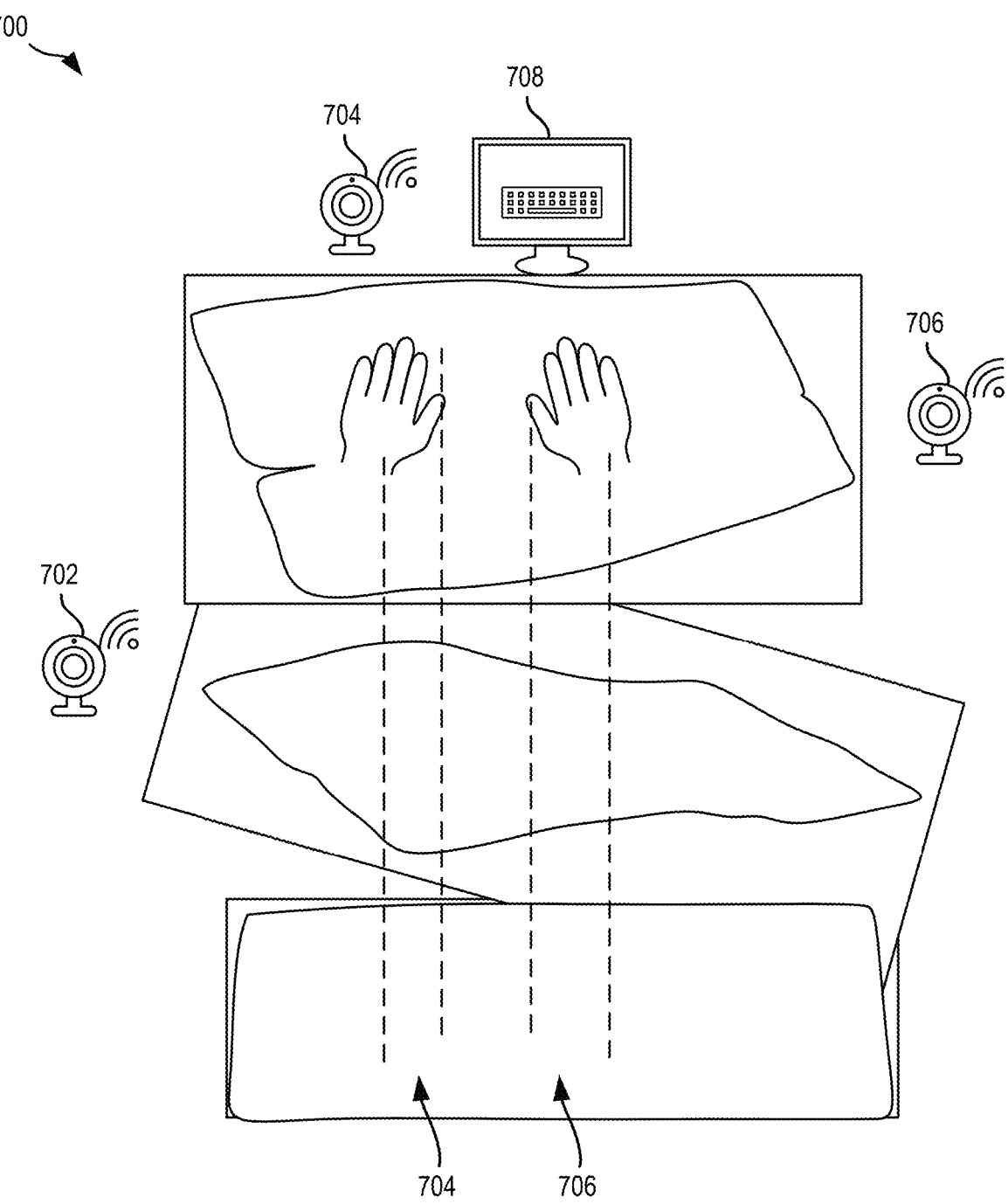
FIG. 7 depicts a system, in accordance with one embodiment of the present invention.

FIG. 7 depicts a system 700 of aligned coordinate plane perspectives of a keyboard model generator, in accordance with one embodiment. As an option, the present system 700 may be implemented in conjunction with features from any other embodiment listed herein, such as those described with reference to the other FIGS. Of course, however, such system 700 and others presented herein may be used in various applications and/or in permutations which may or may not be specifically described in the illustrative embodiments listed herein. Further, the system 700 presented herein may be used in any desired environment.

The system 700 includes a plurality of cameras 702, 704 and 706 that collected information. A computer display 708 is caused to display a first keyboard model, in some approaches. The collected information is used to determine how to update the first keyboard model. Furthermore, the information is analyzed to define how to project a two dimensional version of the keyboard model on the display. Based on this display, the user is provided finger movement and tapping feedback, e.g., such as a feedback of a type described elsewhere herein.

Figure 8:
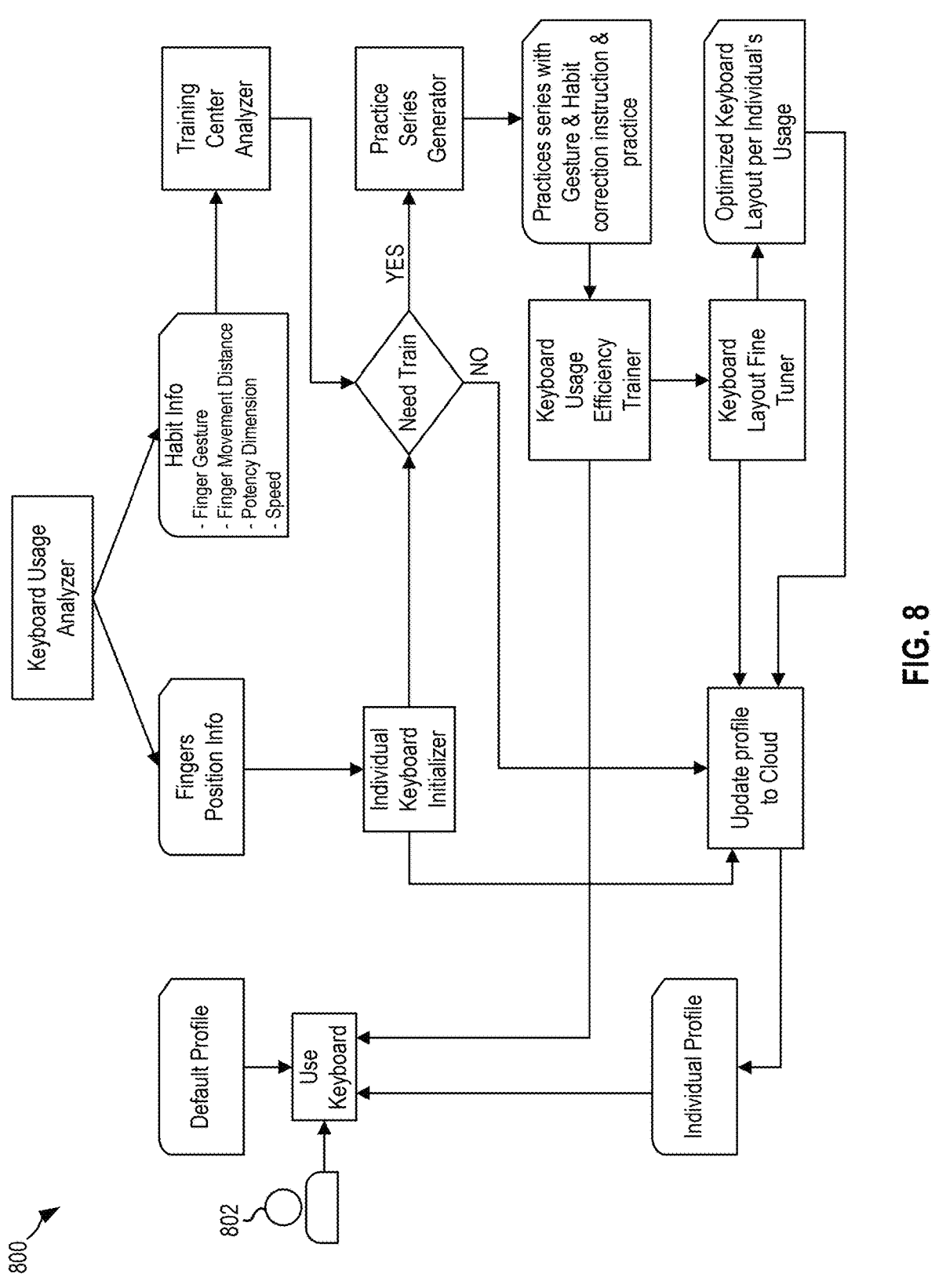
FIG. 8 depicts a system for increasing a typing efficiency of the first user, in accordance with one embodiment of the present invention.

FIG. 8 depicts a system 800 for increasing a typing efficiency of the first user, in accordance with one embodiment. As an option, the present system 800 may be implemented in conjunction with features from any other embodiment listed herein, such as those described with reference to the other FIGS. Of course, however, such system 800 and others presented herein may be used in various applications and/or in permutations which may or may not be specifically described in the illustrative embodiments listed herein. Further, the system 800 presented herein may be used in any desired environment.

The system includes a first user 802 using a first keyboard model, e.g., see user keyboard. In some approaches, the first keyboard model may be a default keyboard model that is pulled from a profile associated with the first user, e.g., see default profile.

In some approaches, a first keyboard model (a keyboard sphere space) is projected on at least three coordinate planes. A camera perpendicular to the coordinate plane which is with the largest projection in the three coordinate planes may be chosen as a main projection device, and the corresponding coordinate plane may be the main coordinate system for subsequent calculations. Information is collected and used to determine how to update the first keyboard model in order to increase a typing efficiency of the first user. For example, this information may detail habits of the user (e.g., see habit info) which may include, e.g., palm movement in vertical mapping to keyboard line feeds, horizontal finger displacement based on the same keyboard sphere (which may be used to identify finger shifts within the same keyboard line), finger position information, etc. In some approaches, an individual keyboard initializer of system 300 may be caused, e.g., instructed, to act as a key pressing deducer based on finger movement analysis techniques described herein.

Projection of the first keyboard model may include projecting a three dimensional keyboard sphere into a two dimensional plane to generate a two dimensional virtual keyboard, which may be shown in display devices, in some approaches. In some other approaches, the keyboard layout projected from three dimensional keyboard sphere is curved by considering user's hands and fingers characters including size, gesture and movement habit. Three dimensional keyboard personalization is enabled, in some approaches, via fine-tuned three dimensional keyboard modeling based on collected information. This information may, in some approaches, include the user's hand size and/or finger size. In some other approaches, the information may additionally and/or alternatively be based on gesture and movement habits of the user. A three dimensional keyboard layout may be curved and modeled based on user's hands and finger size captured from cameras.

Based on keyboard model usage, observed input difficulties, determined error-prone parts of a current keyboard model may be determined. In some approaches, the inaccuracies are corrected by updates, while, in some other approaches, these inaccuracies may be remedied by tutorials that are generated using techniques of a type that would become apparent to one of ordinary skill in the art after reading the descriptions herein, e.g., "see training center analyzer" component and practice series generator. In some approaches, the generator may be caused, e.g., instructed, to identify and incorporate behavior into updates which may include practice tasks (e.g., see practices series with gesture and habit correction instruction and practice which may work with a keyboard usage efficiency trainer component).

Updates may, in some approaches, be determined subsequent to, and in response to, training the user to use a three dimensional keyboard and how to optimize the three dimensional keyboard based on user's personality. For example, a determination may be made as to whether the user who is using the three dimensional free-hand keyboard needs training to determine best practices, e.g., see "Need Train". In response to a determination that the user can benefit from training (e.g., has not been previously trained), the keyboard model may be optimized based on actual user's personality. This may be achieved based on a generator providing a series of gesture and habit correction instruction and practice lessons. A keyboard usage efficiency trainer may grade performance of these lessons over time to develop context of the user's unique gestures and habits. This may be incorporated into the user's profile. Based on usage of keyboard models during these training sessions, a fine tuner component may be used to determine the updates to the keyboard model, as described in greater detail elsewhere herein, e.g., see Keyboard Layout Fine Tuner.

For context, the updates mentioned above, in some approaches, include using the collected information to determine fine-tuned (e.g., see fine tuner) based on user personality including observed personal gestures, finger movement habits, etc., to improve user experience and promote accuracy by ongoingly generating an updated optimized keyboard layout for the individual user. These updates, in some approaches, include redefining different spatial areas of the first keyboard model in a three dimensional space for promoting efficient multi-content input and intelligent auxiliary keyboard input. In some approaches, intelligent and fast interaction in different dimensions of the three dimensional space through body rotation are determined, and angle displacement between body and cameras may be captured to identify which keyboard sphere is switched to collect further information for determining updates. These updates may be used to update a profile of the user, which may be stored to cloud storage in some approaches.

In some approaches, features of the invention described herein include enabling detection of a spherical rotation, e.g., in response to detecting the user sliding a finger, quickly causing a switch between different spaces to distinguish display letter space, word space or sentence space. In some approaches, in each space, select letters, words, or sentences may be sized and sorted by a determined likelihood. For example, in response to detecting the user lifting their hand in a predetermined gesture (more than a predetermined threshold distance) and detecting a selection action (clicking of an index finger) thereafter, a selection may be determined to have been made on a projected keyboard model.

The techniques described herein help users to get rid of the constraints of traditional input device keyboards by using cameras to extend input to three dimensional space. This breaks the operational constraints of physical keyboard devices within two dimensional space, and provides training and fine tuning mechanisms to adjust the keyboard models over time based on uniqueness of individual users, e.g., keyboard modeling to fit a user's hands and fingers, characteristics (including size, gesture, and movement habits), etc.

Use cases environments of the techniques described herein may include user's input devices including but not limited to: computers/tablets/phone screens, projectors, three dimensional projection/hologram, head mount display (HMD) augmented reality and/or virtual reality devices, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
causing a first keyboard model to be projected on a surface;
causing cameras to monitor a first user with respect to at least three coordinate planes;
collecting first information based on multiple positions of palm(s) of the first user with respect to multiple of the at least three coordinate planes;
collecting second information based on vertical palm movement and/or horizontal finger shifts of the first user with respect to a first plane of the at least three coordinate planes;
determining, based on the first information and the second information, updates for increasing a typing efficiency of the first user;

generating a second keyboard model, wherein the second keyboard model is a version of the first keyboard model modified to include the determined updates; and causing the second keyboard model to be projected, wherein the determined updates include: rearranging a placement of a first key of the first keyboard model in the second keyboard model, wherein the rearranging the placement of the first key of the first keyboard model in the second keyboard model comprises: centering the first key at a forecasted location of a key pressing event on the second keyboard model.

2. The method of claim 1, further comprising:

collecting third information based on arc-shaped finger displacement of the first user with respect to the first coordinate plane, wherein the updates for increasing the typing efficiency of the first user are based on the third information.

3. The method of claim 2, wherein the collecting third information based on the arc-shaped finger displacement of the first user with respect to the first coordinate plane comprises:

causing at least a first camera to track a middle finger of the first user during a first instance of the arc-shaped finger displacement of the first user with respect to the first coordinate plane, wherein the first camera is mounted perpendicular to the first coordinate plane which is an XY plane, wherein a second of the coordinate planes is a YZ plane, wherein a third of the coordinate planes is a ZX plane;

determining whether the arc-shaped finger displacement exceeds a predetermined threshold arc distance; and in response to a determination that the arc-shaped finger displacement exceeds the predetermined threshold arc distance, determining that a first key pressing event has occurred and storing information about the first key pressing event to a predetermined file.

4. The method of claim 3, further comprising:

collecting fourth information based on an extent of force applied to the surface during the first key pressing event, wherein the updates for increasing the typing efficiency of the first user are based on the fourth information, wherein the determined updates include visual feedback and/or audio feedback played by a device paired with a device that projects the second keyboard model.

5. The method of claim 4, further comprising:

causing a first trained artificial intelligence (AI) model to analyze the predetermined file, wherein the updates for increasing the typing efficiency of the first user are obtained as an output of the first trained AI model;

storing, in a predetermined training set of data, the first information, the second information, the third information, and the fourth information;

training a second AI model using the predetermined training set of data;

in response to a determination that the second AI model reaches a predetermined accuracy in determining updates for increasing the typing efficiency of the first user, causing the second AI model to analyze information about a second user; and causing the second AI model to, based on the analysis of the information about the second user, generate a third keyboard model for increasing a typing efficiency of the second user.

6. The method of claim 1, wherein a first of the cameras is mounted perpendicular to a first coordinate plane which is an XY plane, wherein a second of the cameras is mounted perpendicular to a second coordinate plane which is a YZ plane, wherein a third of the cameras is mounted perpendicular to a third coordinate plane which is an ZX plane.

7. The method of claim 1, wherein the determined updates include changing an angular positioning of a device used to collect the first information and/or the second information, wherein the first information is based on a hand size and/or finger size of the first user, wherein the second information is based on gesture and movement habits of the user.

8. A computer program product comprising: one or more non-transitory computer-readable storage media; and program instructions stored on the one or more non-transitory computer-readable storage media to perform operations comprising:

causing a first keyboard model to be projected on a surface;

causing cameras to monitor a first user with respect to at least three coordinate planes;

collecting first information based on multiple positions of palm(s) of the first user with respect to multiple of the coordinate planes;

collecting second information based on vertical palm movement and/or horizontal finger shifts of the first user with respect to a first plane of the at least three coordinate planes;

determining, based on the first information and the second information, updates for increasing a typing efficiency of the first user;

generating a second keyboard model, wherein the second keyboard model is a version of the first keyboard model modified to include the determined updates; and causing the second keyboard model to be projected, wherein the determined updates include rearranging a placement of a first key of the first keyboard model in the second keyboard model, wherein the rearranging the placement of the first key of the first keyboard model in the second keyboard model comprises: centering the first key at a forecasted location of a key pressing event on the second keyboard model.

9. The computer program product of claim 8, wherein the operations further comprise:

collecting third information based on arc-shaped finger displacement of the first user with respect to the first coordinate plane, wherein the updates for increasing the typing efficiency of the first user are based on the third information.

10. The computer program product of claim 9, wherein the collecting third information based on the arc-shaped finger displacement of the first user with respect to the first coordinate plane comprises:

causing at least a first camera to track a middle finger of the first user during a first instance of the arc-shaped finger displacement of the first user with respect to the first coordinate plane, wherein the first camera is mounted perpendicular to the first coordinate plane which is an XY plane, wherein a second of the coordinate planes is a YZ plane, wherein a third of the coordinate planes is a ZX plane;

determining whether the arc-shaped finger displacement exceeds a predetermined threshold arc distance; and in response to a determination that the arc-shaped finger displacement exceeds the predetermined threshold arc distance, determining that a first key pressing event has occurred and storing information about the first key pressing event to a predetermined file.

11. The computer program product of claim 10, wherein the operations further comprise:

collecting fourth information based on an extent of force applied to the surface during the first key pressing event, wherein the updates for increasing the typing efficiency of the first user are based on the fourth information, wherein the determined updates include visual feedback and/or audio feedback played by a device paired with a device that projects the second keyboard model.

12. The computer program product of claim 11, wherein the operations further comprise:

causing a first trained artificial intelligence (AI) model to analyze the predetermined file, wherein the updates for increasing the typing efficiency of the first user are obtained as an output of the first trained AI model;

storing, in a predetermined training set of data, the first information, the second information, the third information, and the fourth information;

training a second AI model using the predetermined training set of data;

in response to a determination that the second AI model reaches a predetermined accuracy in determining updates for increasing the typing efficiency of the first user, causing the second AI model to analyze information about a second user; and causing the second AI model to, based on the analysis of the information about the second user, generate a third keyboard model for increasing a typing efficiency of the second user.

13. The computer program product of claim 11, wherein a first of the cameras is mounted perpendicular to a first coordinate plane which is an XY plane, wherein a second of the cameras is mounted perpendicular to a second coordinate plane which is a YZ plane, wherein a third of the cameras is mounted perpendicular to a third coordinate plane which is an ZX plane.

14. The computer program product of claim 8, wherein the determined updates are further selected from a group consisting of: decreasing a size of the first key, increasing the size of the first key, and changing an angular positioning of a device used to collect the first information and/or the second information, wherein the first information is based on a hand size and/or finger size of the first user, wherein the second information is based on gesture and movement habits of the user.

15. A computer system comprising:

a processor set;

one or more computer-readable storage media; and program instructions stored on the one or more storage media to cause the processor set to perform operations comprising:

causing a first keyboard model to be projected on a surface;

causing cameras to monitor a first user with respect to at least three coordinate planes;

collecting first information based on multiple positions of palm(s) of the first user with respect to multiple of the coordinate planes;

collecting second information based on vertical palm movement and/or horizontal finger shifts of the first user with respect to a first plane of the at least three coordinate planes;

determining, based on the first information and the second information, updates for increasing a typing efficiency of the first user;

generating a second keyboard model, wherein the second keyboard model is a version of the first keyboard model modified to include the determined updates; and causing the second keyboard model to be projected, wherein the determined updates include:

rearranging a placement of a first key of the first keyboard model in the second keyboard model, wherein the rearranging the placement of the first key of the first keyboard model in the second keyboard model comprises: centering the first key at a forecasted location of a key pressing event on the second keyboard model.

16. The computer system of claim 15, wherein the operations further comprise:

collecting third information based on arc-shaped finger displacement of the first user with respect to the first coordinate plane, wherein the updates for increasing the typing efficiency of the first user are based on the third information.

17. The computer system of claim 16, wherein the collecting third information based on the arc-shaped finger displacement of the first user with respect to the first coordinate plane comprises:

causing at least a first camera to track a middle finger of the first user during a first instance of the arc-shaped finger displacement of the first user with respect to the first coordinate plane, wherein the first camera is mounted perpendicular to the first coordinate plane which is an XY plane, wherein a second of the coordinate planes is a YZ plane, wherein a third of the coordinate planes is a ZX plane;

determining whether the arc-shaped finger displacement exceeds a predetermined threshold arc distance; and in response to a determination that the arc-shaped finger displacement exceeds the predetermined threshold arc distance, determining that a first key pressing event has occurred and storing information about the first key pressing event to a predetermined file.

18. The computer system of claim 17, wherein the operations further comprise:

collecting fourth information based on an extent of force applied to the surface during the first key pressing event, wherein the updates for increasing the typing efficiency of the first user are based on the fourth information, wherein the determined updates include visual feedback and/or audio feedback played by a device paired with a device that projects the second keyboard model.

* * * * *